United States Patent

Kawai et al.

[11] Patent Number: 5,819,199
[45] Date of Patent: Oct. 6, 1998

[54] PORTABLE NAVIGATION APPARATUS FOR INDICATING PRESENT POSITION ON A MAP WITH INDICATED REFERENCE LATITUDINAL AND LONGITUDINAL LINES BASED ON SURVEYED PRESENT POSITION DATA

[75] Inventors: Kozo Kawai; Kaname Okuno; Yoshinobu Sakamura, all of Kadoma, Japan

[73] Assignee: Matsushita Electric Works, Ltd., Osaka, Japan

[21] Appl. No.: 621,140

[22] Filed: Mar. 21, 1996

[30] Foreign Application Priority Data

Mar. 28, 1995 [JP] Japan .................................. 7-070233

[51] Int. Cl.$^6$ .......................... G01C 21/20; G06F 165/00
[52] U.S. Cl. .......................... 701/200; 701/207; 701/208; 701/212; 701/213; 340/990; 340/995; 342/357
[58] Field of Search .............................. 364/449.1, 449.2, 364/449.6, 449.7, 449.95, 443; 340/990, 995, 988; 342/357, 457; 701/207, 208, 212, 213, 216, 200

[56] References Cited

U.S. PATENT DOCUMENTS

| | | | |
|---|---|---|---|
| 4,675,676 | 6/1987 | Takanabe et al. | 364/449.6 |
| 5,084,822 | 1/1992 | Hayami | 364/449.6 |
| 5,113,178 | 5/1992 | Yasuda et al. | 345/115 |
| 5,189,430 | 2/1993 | Yano et al. | 342/457 |
| 5,189,632 | 2/1993 | Paajanen et al. | 364/705.05 |
| 5,212,643 | 5/1993 | Yoshida | 340/990 |
| 5,337,242 | 8/1994 | Yamamoto et al. | 364/449.2 |
| 5,353,034 | 10/1994 | Sato et al. | 342/457 |
| 5,471,392 | 11/1995 | Yamashita | 340/995 |
| 5,596,500 | 1/1997 | Sprague et al. | 364/449.7 |

*Primary Examiner*—Tan Q. Nguyen
*Attorney, Agent, or Firm*—Lynn & Lynn

[57] ABSTRACT

A navigation apparatus is provided for surveying the position of the apparatus with such surveying unit as a global positioning system (GPS), to have respective figures of reference latitudinal and longitudinal lines X and Y displayed on a display device and, at the same time, to have the latitude and longitude of the position to be indicated by a present position mark of the apparatus calculated in accordance with a preliminarily set scale of reduction of a map utilized. Then, the user places the apparatus on the map so that the latitudinal and longitudinal lines X and Y displayed on the apparatus will coincide with corresponding latitudinal and longitudinal lines on the map, and then the present position can be recognized by the user by means of the present position mark of the display device on the map.

14 Claims, 13 Drawing Sheets

FIG. 6

| SCALE OF REDUCTION | | | INTERVALS BETW. LAT. | INTERVALS BTWN. LONG LINE |
|---|---|---|---|---|
| from 1/700 | to | 1/700 | — | — |
| from 1/1,300 | to | 1/1,300 | 1" | 1" |
| from 1/3,300 | to | 1/3,300 | 2" | 2" |
| from 1/6,500 | to | 1/6,500 | 5" | 5" |
| from 1/13,000 | to | 1/13,000 | 10" | 10" |
| from 1/19,500 | to | 1/19,500 | 20" | 20" |
| from 1/38,800 | to | 1/38,800 | 30" | 30" |
| from 1/78,000 | to | 1/78,000 | 1' | 1' |
| from 1/194,000 | to | 1/194,000 | 2' | 2' |
| from 1/388,000 | to | 1/388,000 | 5' | 5' |
| from 1/775,000 | to | 1/755,000 | 10' | 10' |
| from 1/1,170,000 | to | 1/1,170,000 | 20' | 20' |
| from 1/2,330,000 | to | 1/2,330,000 | 30' | 30' |
| from 1/4,650,000 | OVER | 1/4,650,000 | 1° | 1° |

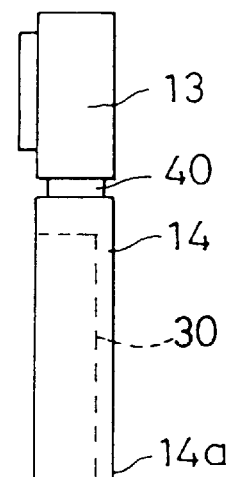
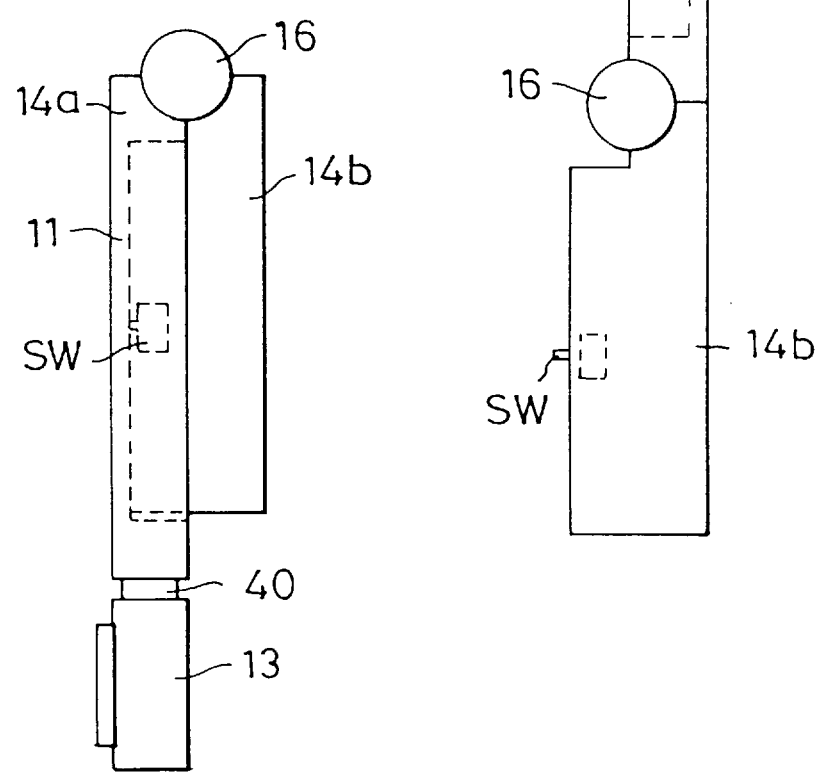
FIG. 11
FIG. 12

PORTABLE NAVIGATION APPARATUS FOR INDICATING PRESENT POSITION ON A MAP WITH INDICATED REFERENCE LATITUDINAL AND LONGITUDINAL LINES BASED ON SURVEYED PRESENT POSITION DATA

BACKGROUND OF THE INVENTION

This invention relates to a navigation apparatus which is capable of surveying and displaying the present position of the user, by means of such surveying unit as a global positioning system (GPS) employed.

DESCRIPTION OF RELATED ART

As conventional navigation apparatus, there have been practically utilized arrangements in which a map information obtainable by digitizing respective points of roads of a map is stored in such memory medium as CD-ROM, IC card and the like, the present position is surveyed by means of such surveying device as GPS, and the position is displayed on a display device to which the map information of an area including the present position is read out, which arrangement is referred to as an electronic map.

As another arrangement which does not constitute the foregoing electronic map, on the other hand, there has been disclosed in Japanese Patent Laid-Open Publication No. 6-138203 an arrangement in which a large number of maps in which the map information is printed are stored, a required one of the maps is taken out, and the present position is displayed on the particular map.

In the case of the foregoing arrangement employing the map information, however, it is required to provide, in an event where the map information is stored in the CD-ROM, a CD-ROM driving unit and corresponding circuit for reading out stored data of the map information or, where the map information is stored in the IC card, and IC card driving unit and a connector.

In this case, there has been a problem that the storage of a huge number of the map information in such memory medium as the CD-ROM or IC card has required much costs and many hours. Particularly in the event where the IC card is employed, the IC card has to be of a large memory capacity, so as to elevate the costs. Further, the CD-ROM driving unit required when CD-ROM is used has been expensive enough for rendering the apparatus unable to be inexpensive but readily able to be enlarged in dimensions.

In the known event of employing the map, there has been a problem that the dimension of the apparatus cannot be made smaller than at least the map so that, when a large map is used for easier visibility, the apparatus has to be enlarged, whereas an intention to minimize the apparatus should entail in the minimization in size of the map, the visibility of which is thereby made to be low. An example of such apparatus has been described in, for example, Japanese Patent Laid-Open Publication No. 5-100619.

In the known apparatus of this Publication No. 5-100619, the arrangement is so made that the present position can be displayed with a two dimensional operation of a cursor, and that the present position is presented by means of many rectangular zones provided to the map and the two dimensional cursor display brought into conformity with corresponding one of the rectangular zones. In this case, there arises a problem that a display means is required to have an outline made to coincide with the reduced scale of the rectangular zone of the map, so as to be troublesome, and the reduced scale has to be constant, so as to render the general use of the apparatus to be low.

SUMMARY OF THE INVENTION

The present invention has been suggested in view of the foregoing defects of the known apparatus, and a primary object of the invention is to provide a navigation apparatus which does not require any expensive memory medium nor any driving device causing the apparatus to be enlarged, but is capable of readily displaying the present position on any general use maps without causing the apparatus to be enlarged in size.

According to the present invention, the above object can be realized by means of a navigation apparatus comprising means for surveying the latitude and longitude of a present position in correspondence with a map including latitudinal and longitudinal lines, means for displaying the present position on the basis of a result of the survey made by the surveying means in a manner allowing the position of the latitudinal and longitudinal lines to be specified along with the present position, means for controlling displaying operation of the displaying means, a reduced scale input means for inputting a set reduced scale of the map, and means for modifying the latitudinal line position and longitudinal line position to be displayed by the displaying means in accordance with the reduced scale of the map, wherein means is provided for enabling the latitudinal and longitudinal line positions displayed by the displaying means to be brought into agreement with the latitudinal and longitudinal lines on the map and presenting the present position on the map with a present position mark provided to the displaying means which is to be placed on the map.

Other objects and advantages of the present invention shall become clear as the description advances as detailed with reference to accompanying drawings showing a plurality of preferred embodiments according to the present invention.

BRIEF DESCRIPTION OF THE DRAWINGS

FIG. 6 is a diagram showing the relationship between the reduced scale and the intervals of latitudinal and longitudinal lines in the map employed in the embodiment of FIG. 3;

FIG. 11 is a side elevation in a stretched state of the apparatus in the embodiment of FIG. 9;

FIG. 12 is a side elevation in the double-folded state as in FIG. 10 of the apparatus in the embodiment of FIG. 9;

While the present invention shall now be described in the followings with reference to the preferred embodiments shown, it should be appreciated that the intention is not to limit the present invention only to these embodiments but rather to include all alterations, modifications and equivalent arrangements possible within the scope of appended claims.

DETAILED DESCRIPTION OF THE PREFERRED EMBODIMENTS

The respective embodiments of the present invention shall now be described in the followings with reference to the drawings.

Figure 1:
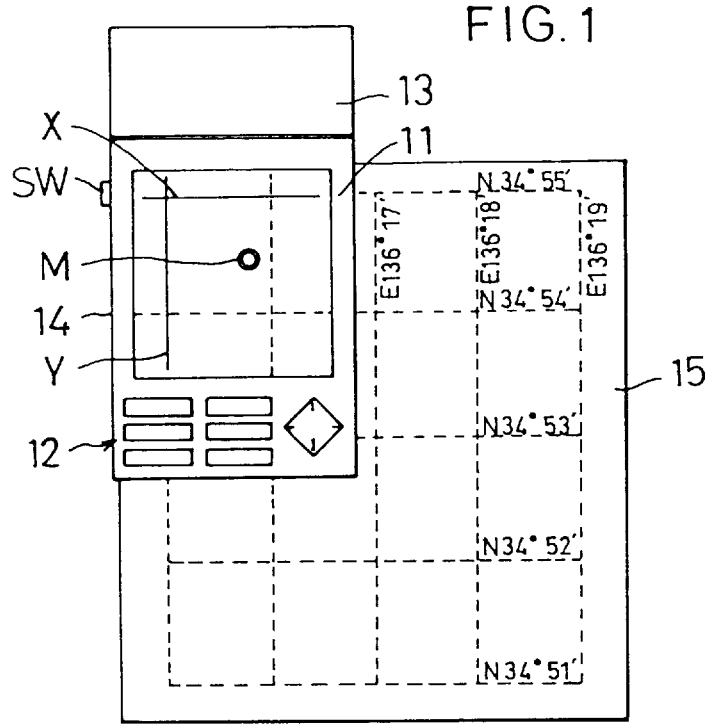
FIG. 1 is a schematic explanatory view for a state in which the navigation apparatus in an embodiment according to the present invention is being practically used as placed on a map.
Figure 2:
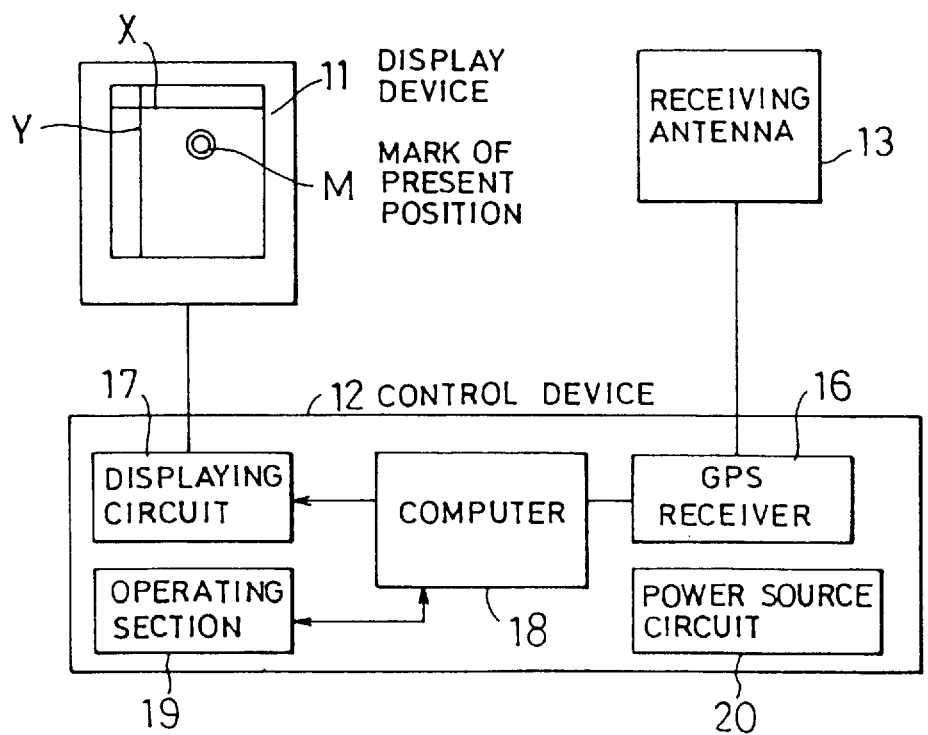
FIG. 2 shows in a block circuit diagram the entire arrangement of the apparatus in an embodiment according to the present invention.

Now, in FIG. 1, there is shown an arrangement employing an embodiment of the navigation apparatus according to the present invention and, in FIG. 2, the entire arrangement of this embodiment is shown in a block diagram. The navigation apparatus in this embodiment generally comprises a display device 11, a control device 12, and a receiving antenna unit 13 of a GPS receiver provided in the control device 12, and the apparatus is provided to be placeable on or against a generally available paper map 15 as shown schematically in FIG. 1. The display device 11 and control device 12 are integrally installed to an apparatus body 14, and the receiving antenna unit 13 is mounted to an upper side face of the body 14.

The display device 11 is designed to be capable of presenting the latitudinal line X and longitudinal line Y for being placed in agreement with the latitudinal and longitudinal lines on the map, and to be provided with a present position mark M for indicating the present position on the map.

The control device 12 includes a GPS receiver 16 which performs the survey by means of electric waves received from the GPS satellites through the receiving antenna unit 13, and a displaying circuit 17 for carrying out a display operation of the display device 11, so that the latitudinal and longitudinal lines X and Y will be displayed by the display device 11 through the displaying circuit 17 on the basis of the data of latitude and longitude surveyed by the GPS receiver 16.

In the above, the GPS receiver 16 continues to survey the latitude and longitude at intervals of about 1 second, with the electric waves transmitted from the GPS satellites and received through the receiving antenna unit 13.

The control device 12 includes, for example, six operating keys K1–K6, in which the key K1 is for displaying the present position on the display device 11 and inputting the data of present position, the key K2 is for setting the data of types of the series of maps, the key K3 is for setting the reduced scale of the map to be employed, the key K4 is for setting the destination, the key K5 is for selecting a menu, and the key K6 is for deciding and instructing input data.

The operation of the apparatus in the present embodiment shall be described next. First, a standard scale of reduction of the map 15 is set to the apparatus, and is stored preferably in a memory backed up by batteries or such memory section (not shown) as EEPROM or the like which holds the data even when a power source is turned off and, as a power source switch SW provided to a side wall of the apparatus body 14 is turned ON, a power can be supplied from a power source circuit 20 to the control device 12 and to the display device 11. Here, the power source circuit 20 is constituted by a circuit which rectifies and smooths a power from batteries or commercial AC source or converts a DC voltage from a battery for use in cars to a predetermined DC voltage, or a circuit which can select one of these power source circuits.

As the source power is supplied, the GPS receiver 16 starts the survey of the latitude and longitude by means of the electric waves from the GPS satellites and received through the receiving antenna unit 13. This survey is repeated at intervals of 1 second, the computer 18 takes up the data of results of the survey from the GPS receiver 16 upon every completion of every survey to obtain reference latitude and longitude on the basis of the data taken up, the latitudinal and longitudinal lines X and Y are made to be displayed through the displaying circuit 17 on the display device 11, while the respective reference latitudinal and longitudinal values are displayed along the respective lines X and Y, and at the same time the position to be displayed by the present position mark M is calculated in accordance with the preliminarily set rate of reduction. In the illustrated case, the present position is surveyed to be 136°15'50" of east longitude and 34°54'20" of north latitude and is so pointed by the present position mark M, and the reference latitude and longitude are obtained on the basis of the surveyed data to be 136°15' of east longitude and 34°55' of north latitude and are so indicated.

Here, the navigation apparatus of the present invention is placed on or against the map 15 so as to overlap the latitudinal and longitudinal lines X and Y displayed on the apparatus over the corresponding latitudinal and longitudinal lines given on the map 15, then the present position mark M is to point the present position on the map 15.

Provided here that a mountain climber carrying the present navigation apparatus is moving in a mountainous area or a vehicle or the like is running with the apparatus on board, the present position mark M of the apparatus is to move on the map, as the latitude and longitude being surveyed is renewed. In an event when the reference latitude and longitude indicated are caused to vary, the user is to move the apparatus on the map 15 to overlap the latitudinal and longitudinal lines X and Y over the now corresponding latitudinal and longitudinal lines on the map 15, it is made possible to recognize the new present position on the map 15 by means of the present position mark M.

Figure 3:
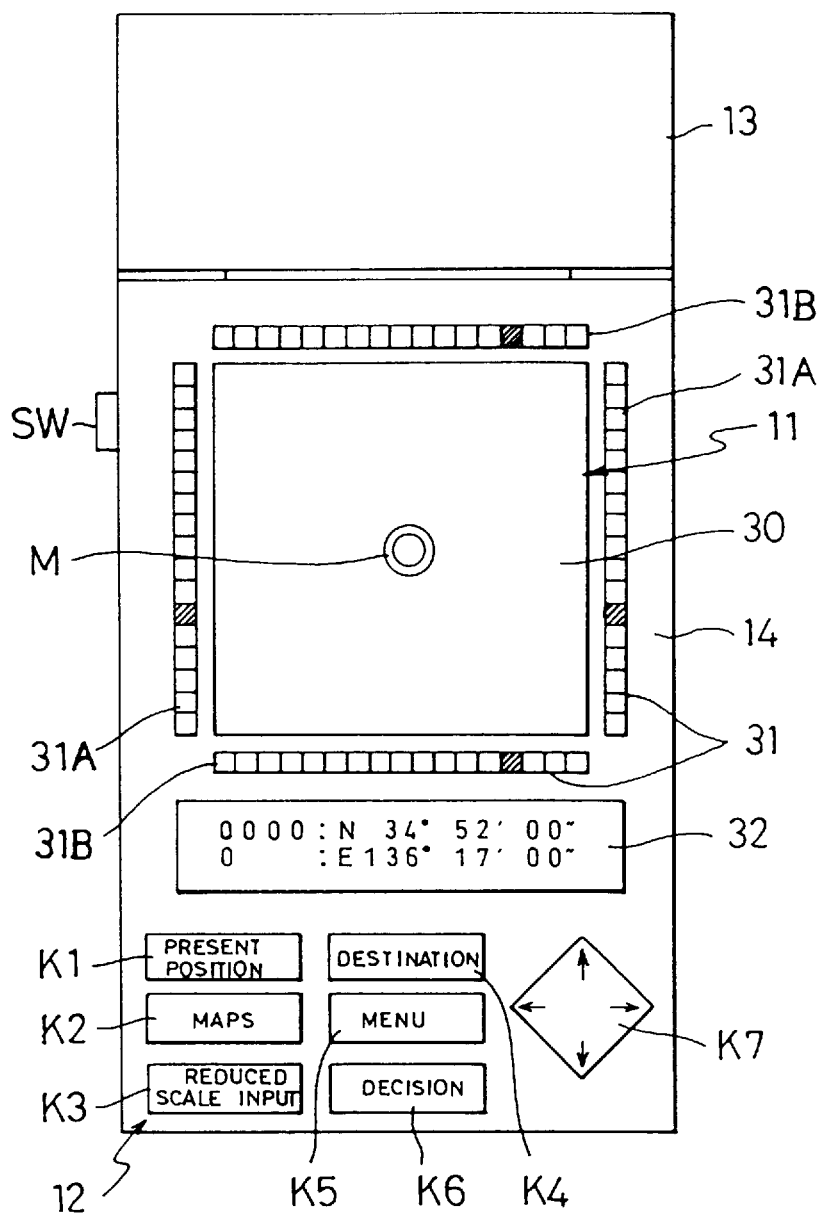
FIG. 3 is a schematic front view of the apparatus in another embodiment according to the present invention.

In FIG. 3, there is shown a practical embodiment of the navigation apparatus according to the present invention, in which the display device 30 is constituted by a transparent plate 30 of a square shape and fitted in a penetrating square window made in the apparatus body 14, a display unit 31 comprising vertical arrays 31A and horizontal arrays 31B respectively of a plurality of light emitting diodes and lying along both longitudinal side edges and both latitudinal side edges of the square window for displaying positions of the latitudinal and longitudinal lines with two clossing pairs of the diodes made to emit light at opposing positions in the vertical arrays 31A and horizontal arrays 31B, which diodes being shown as hatched in FIG. 3, and a display 32 preferably of liquid crystal of a type displaying the latitudinal and longitudinal values in letters and figures at a position on the apparatus body 14 along a lower horizontal diode array 31B of the display unit 31. Substantially in the center of the transparent plate 30, the present position mark M is fixedly provided by means of small double circles.

It is assumed here that the reduced rate of the map 15 is preliminarily set and is stored, for example, in the memory backed up by the batteries or such not shown memory section as the EEPROM or the like which holds the data even upon turning OFF of the power source, the turning ON of the power source switch SW provided on the side wall of the apparatus body 14 causes the electric power from the power source circuit 20 to be supplied to the control device 12 and display device 11. Other constituents and their functions are the same as those in the foregoing embodiment.

Figure 4:
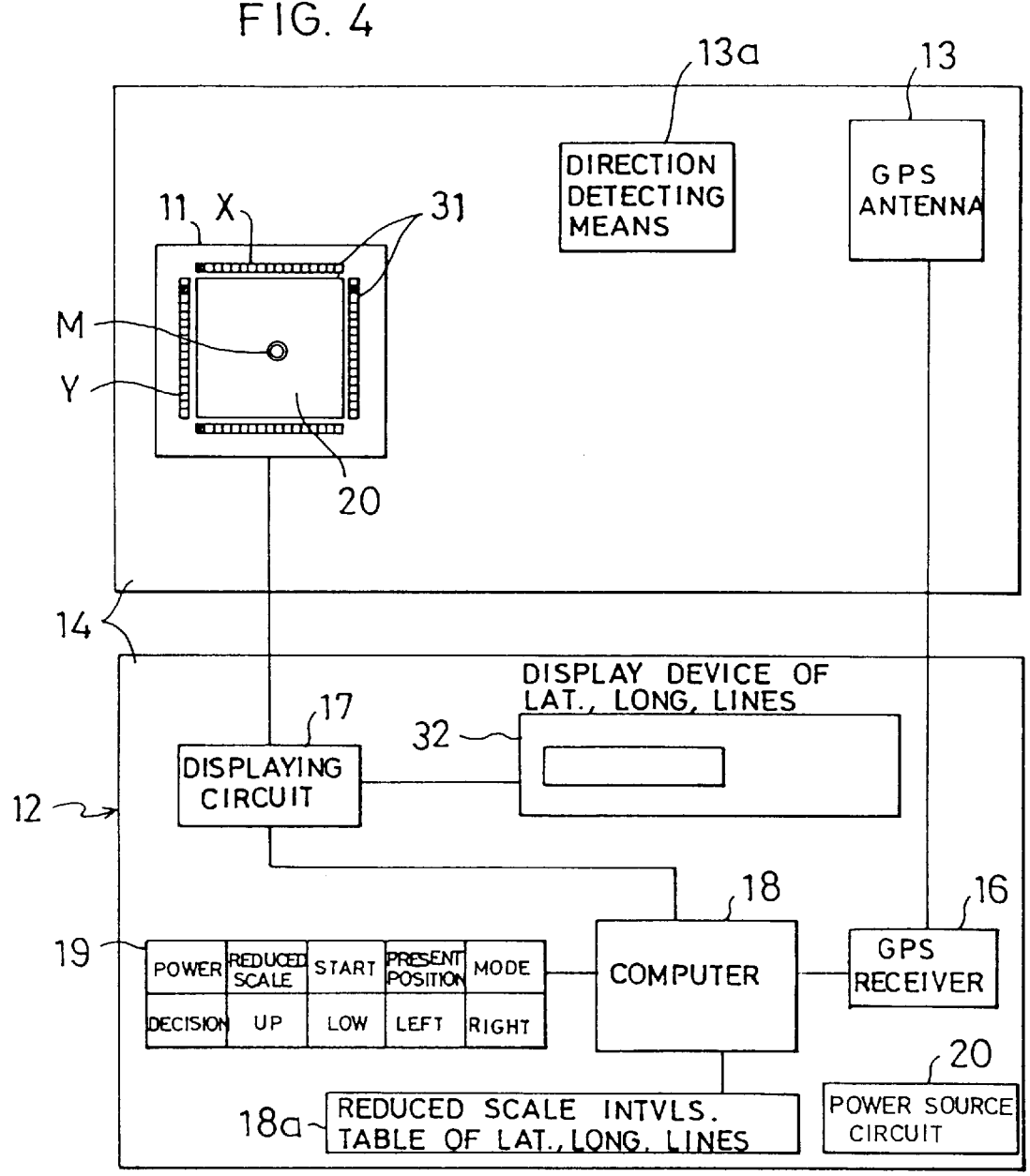
FIG. 4 shows in a block diagram the entire arrangement of the apparatus in the embodiment of FIG. 3.

In FIG. 4, detailed arrangement of the embodiment of FIG. 3 is shown, in which the GPS antenna unit 13 is disposed on the side of the display device 11, together with, preferably, a direction detecting means 13a. In the apparatus body 14, further, an operation input means 19 having the operability more improved than in the case of the foregoing embodiment and a reduced scale interval table 18a of the latitudinal and longitudinal lines are provided as interconnected with the computer 18, so that the operability for recognizing the present position can be improved.

Figure 5:
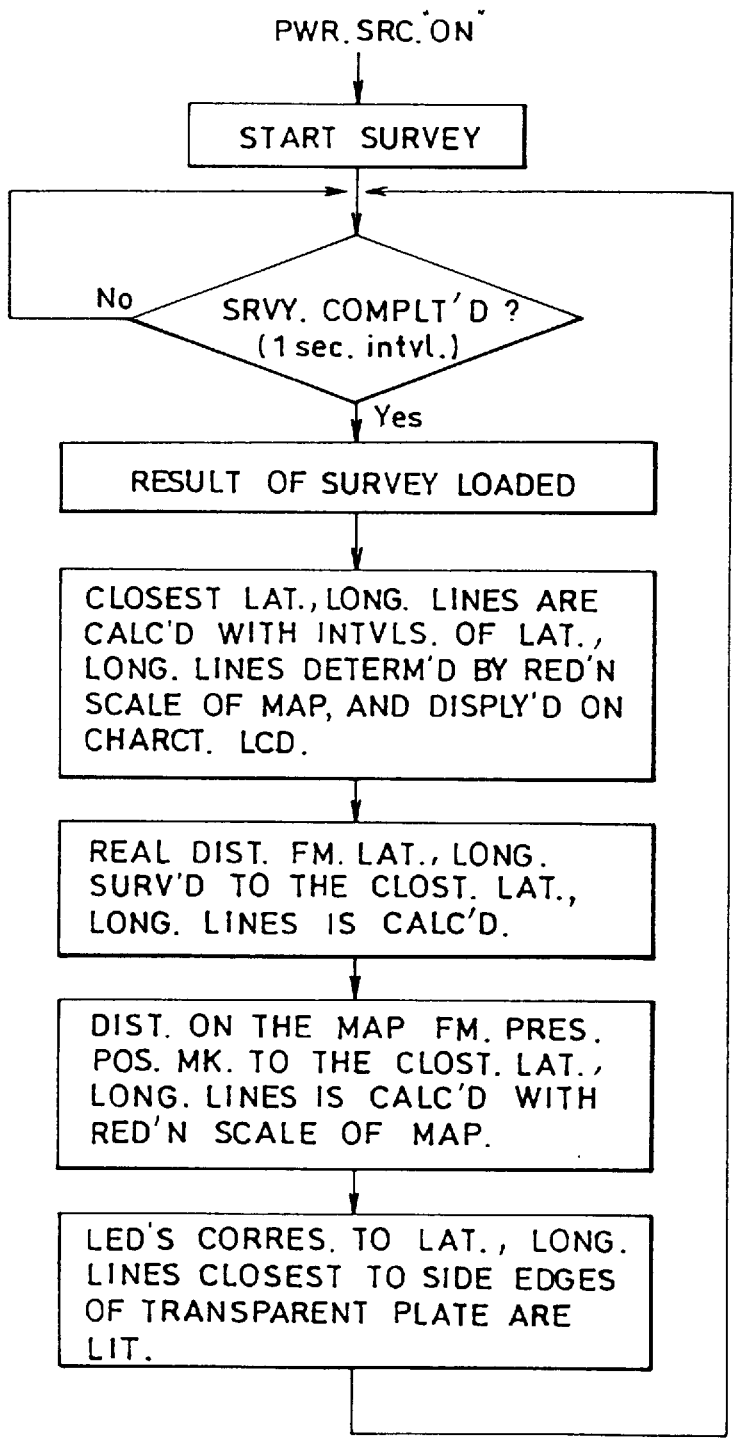
FIG. 5 is a flow chart for explaining the operation of the embodiment shown in FIG. 3.

The operation of the present embodiment will be such flow chart as shown in FIG. 5. That is, it is assumed here that the reduced scale of the map 15 is 1/50,000, and the result of the survey by means of the GPS receiver 16 shows 34°52'10" of north latitude and 136°16'40" of east longitude. The computer 18 obtains, from a relation table as shown in FIG. 6 of the set scale of reduction with respect to intervals between the respective latitudinal lines and of the respective longitudinal lines, that the interval value of the latitudinal and longitudinal lines for the scale 1/50,000 is 1', discriminates from this value 1' and the result of survey that the closest latitudinal and longitudinal lines are respectively 34°52' of north latitude and 136°17' of east longitude, and causes the thus discriminated values displayed on the liquid crystal display 32 of the display device 11.

At the computer 18, further, an operation for determining which light emitting diodes in the arrays of the display unit 31 should be lighted is performed. Since the longitudinal line interval Yo and the latitudinal line interval Xo per 1' at the position of 34°52'10" are respectively about 1523 m and 1848 m, so that a distance LY between the displaying longitudinal line and the present position will be $LY=Yo\times(17'-16'40")=1523\times(20"/60")=508$ m, whereas a distance LX between the displaying latitudinal line and the present position will be $LX=Xo\times(52'10"-52')=1848\times(10"/60")=308$ m.

Because the reduced scale of the map 15 employed here is 1/50,000, corresponding distances Ly and Lx on the map 15 to LY and LX will be Ly=508 m/50000=10.1 mm and Lx=308 m/50000=6.2 mm.

In other words, the position of the displaying latitudinal line is on south side by 6.2 mm from the fixed present position mark M disposed in the center of the transparent plate 30, and the position of the displaying longitudinal line is on east side by 10.1 mm from the mark M.

At this time, an opposing pair of the light emitting diodes disposed rightward by 10.1 mm from the central mark M in the opposing horizontal diode arrays 31B lying along the upper and lower side edges of the transparent plate 30 of the display unit 31 are lighted, and a further opposing pair of the light emitting diodes disposed downward by 6.2 mm from the central mark M in the opposing vertical diode arrays 31A along the left and right side edges of the plate 30 are lighted, respectively.

Figure 7:
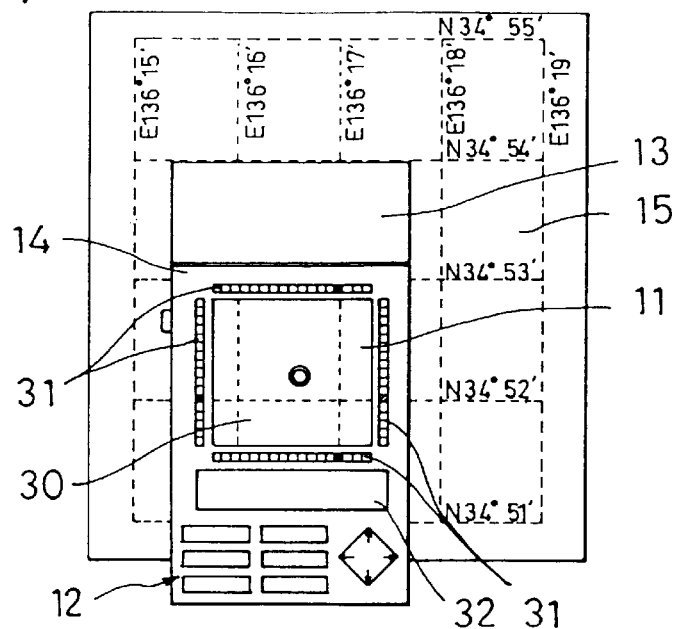
FIG. 7 is a schematic explanatory view for a state in which the apparatus in the embodiment of FIG. 3 is practically used on a map.

Here, as shown in FIG. 7, the apparatus body 14 is placed on the map 15 so that a line connecting between the opposing pair of the lighted diodes in the vertical arrays 31A as well as a further line connecting between the further opposing pair of the lighted diodes in the horizontal arrays 31B will agree with the latitudinal and longitudinal lines of 34°52' of north latitude and 136°17' of east longitude, and the user can immediately recognize the present position on the map 15 by means of the present position mark M of the transparent plate 30, as will be readily appreciated.

Figure 8:
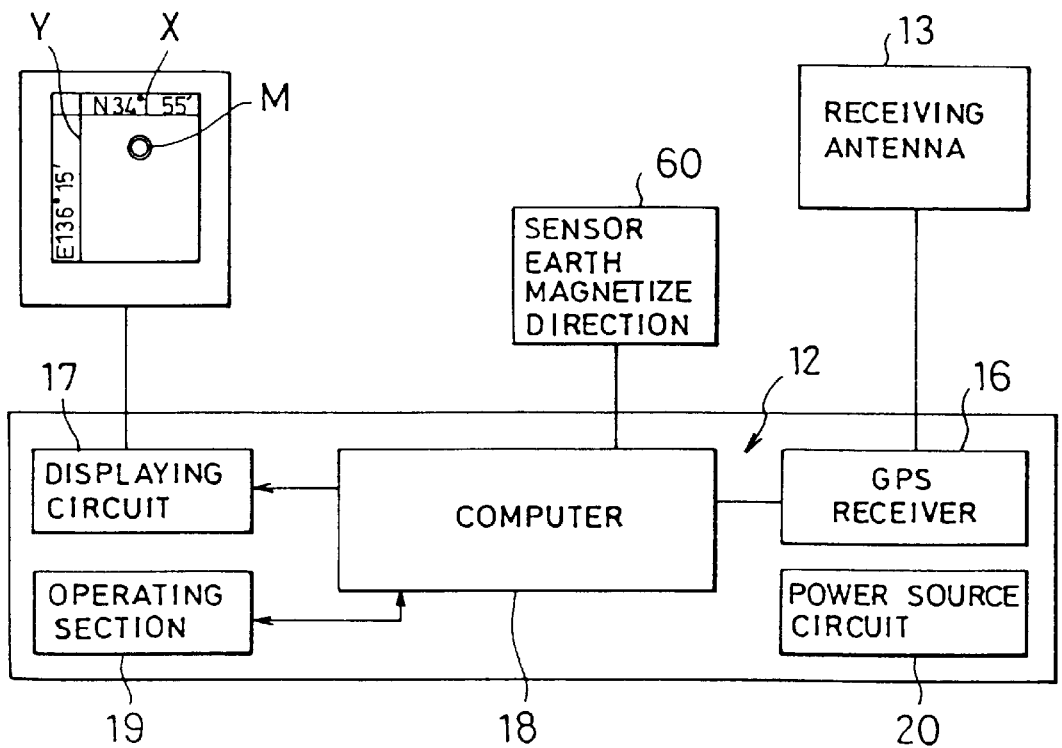
FIG. 8 shows in a block circuit diagram of the entire arrangement the apparatus in another embodiment according to the present invention.

In another embodiment of the present invention shown in FIG. 8, a sensor of earth magnetism direction 60 is incorporated as the direction detecting means 13a for detecting the azimuth, and outputs of this sensor 60 are provided to the computer 18. The azimuth detected by the sensor 60 may be displayed with an arrow N, for example, on part of the liquid crystal display 32 of the display device 11. Other constituents and their functions are substantially the same as those in the foregoing embodiments.

Figure 9:
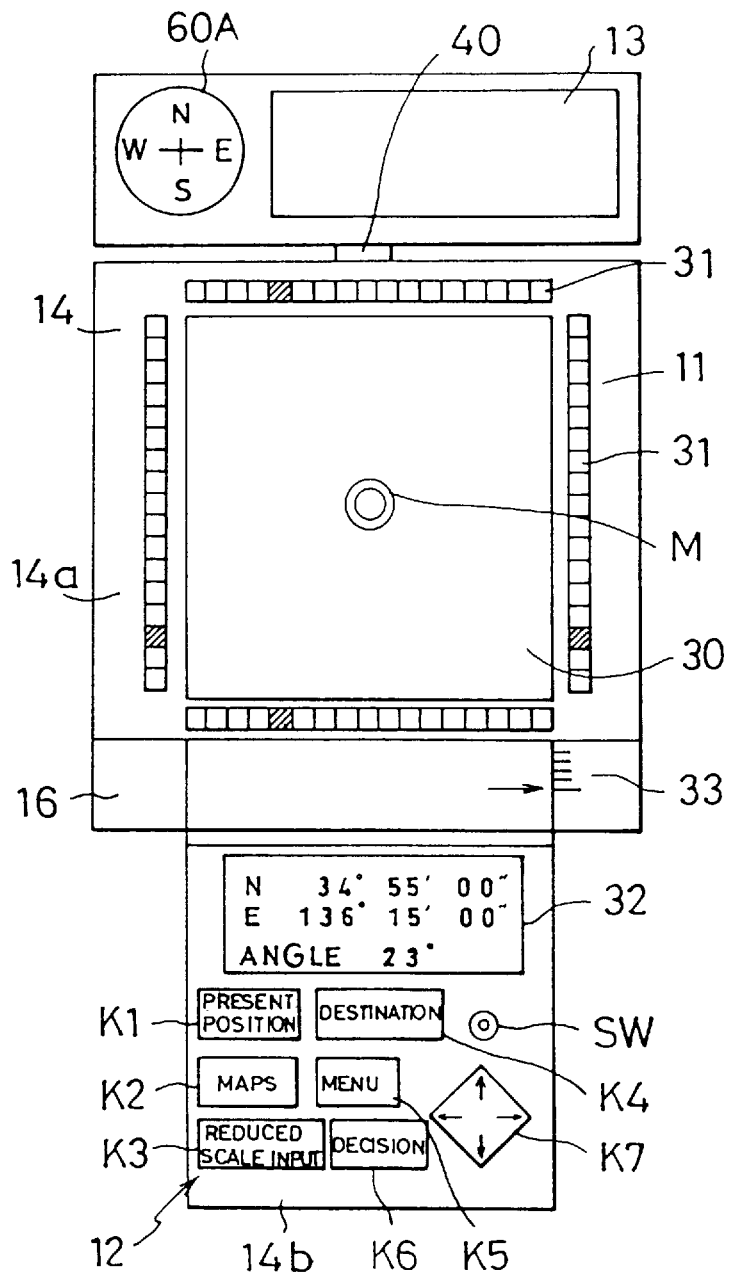
FIG. 9 is a schematic front view of the apparatus in another embodiment according to the present invention.
Figure 10:
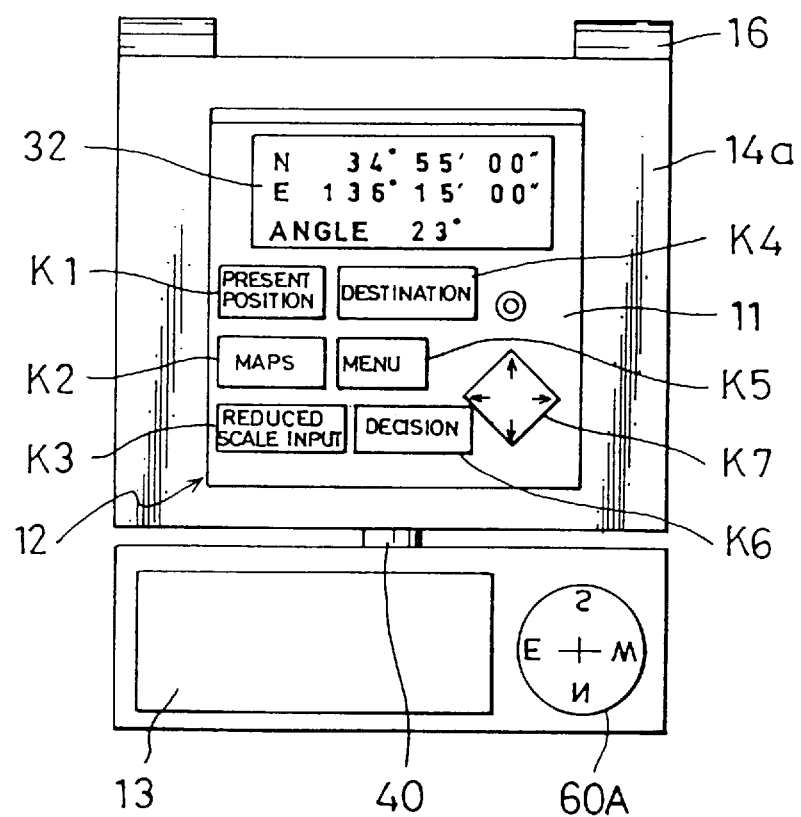
FIG. 10 is a front view in a double-folded state of the apparatus in the embodiment of FIG. 9.
Figure 13:
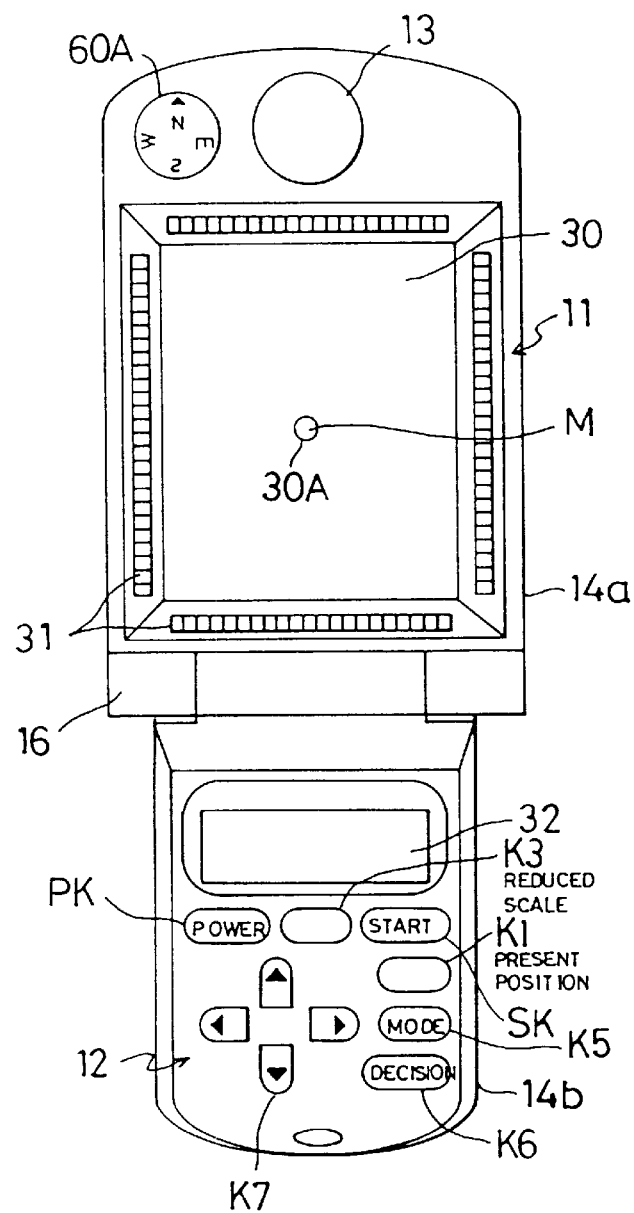
FIG. 13 shows in a front view the apparatus in another and more practical embodiment according to the present invention.

In another embodiment of the present invention shown in FIG. 9, the apparatus body 14 is divided into a display device side section 14a and a control device side section 14b, both of which are coupled mechanically and electrically through a hinge part 16 to be rotatable about an axis of the hinge part 16, and the display device side section 14a and control device side section 14b can be disposed as folded double. In this event, the transparent plate 30 of the display device 11 is disposed as recessed in the square window, so that preferably a half portion or more in thickness direction of the control device side section 14b can be accommodated within a recess formed on the recessed transparent plate 30, and the thickness of the apparatus even in the double-folded state of the display device side section 14a and control device side section 14b can be thereby minimized, as will be clear when FIGS. 9 to 12 are also referred to. In the double-folded state, as seen in FIG. 10, the control device 12 is visible through the transparent plate 30. Further, the receiving antenna unit 13 is also formed as separated from the display device side section 14a but is mechanically and electrically coupled thereto through a short rod 40 allowing the unit 13 rotated about the rod 40 so that, in the double-folded state, the direction sensor 60A on the unit 13 may be positioned reverse by rotating the unit 13 by 180 degrees for simultaneous observation of the sensor 60 with the latitudinal and longitudinal values given on the liquid crystal display 32 kept visible through the transparent plate 30 even in the double-folded state, as seen in FIG. 10. All other constituents and their functions are the same as those in the foregoing embodiments.

In FIGS. 13 through 17, a more concrete embodiment of the navigation apparatus according to the present invention is shown, in which the apparatus body also comprises the display device side section 14a and control device side section 14b mutually foldably coupled through the hinge part 16, while both sections 14a and 14b are formed preferably in a plastic casing, so that the display device side section 14a includes the transparent plate 30, diode array display unit 31, receiving antenna unit 13 and direction sensor 60A of a compass type, and the control device side section 14b includes the liquid-crystal display 32, power source key PK, start key SK, reduced-scale key K3, mode key K5, decision key K6 and latitude and longitude controlling keys K7, respectively as optimumly accommodated and disposed. It is also preferable that the apparatus is formed in a moisture-proof type, taking into account that the apparatus of the present invention will have to be used under such bad conditions as rainy weather and so on. Further, as will be clear from FIG. 16, the present position mark M provided in the center of the transparent place 30 is made as a through hole 30A, in which event, it is possible to provide a marking of the present position onto the map through the hole 30A and even to record on the map a moving locus. And the liquid crystal display 32 is formed in an arrangement of 5×7 dots as shown in FIG. 18, for realizing the required display including the foregoing display.

Figure 14:
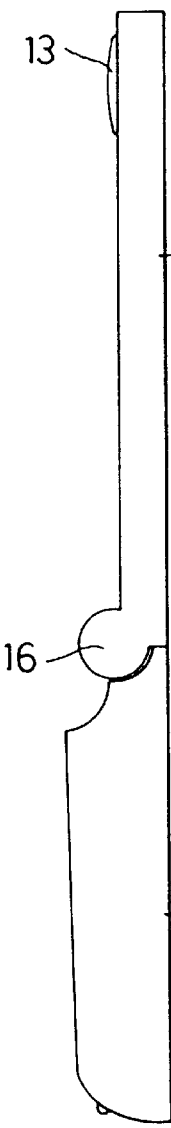
FIG. 14 is a side elevation of the apparatus in the embodiment of FIG. 13, which is in a state of use as stretched.
Figure 15:
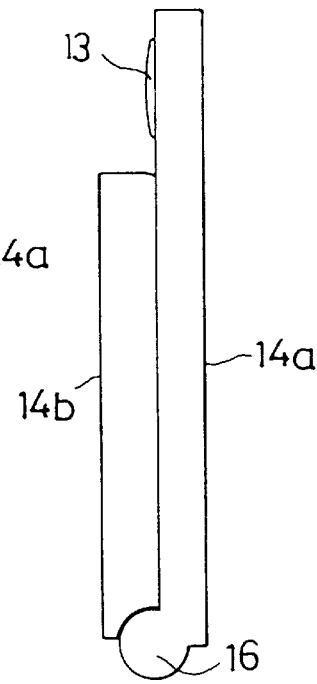
FIG. 15 is a side elevation of the apparatus in the embodiment of FIG. 13 in a double-folded state.
Figure 16:
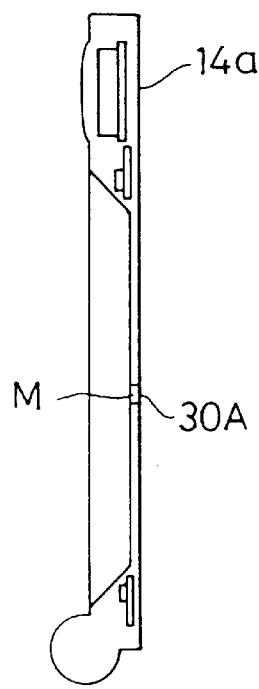
FIG. 16 is a vertically sectioned view at a display unit side section of the apparatus in the embodiment of FIG. 13.
Figure 17:
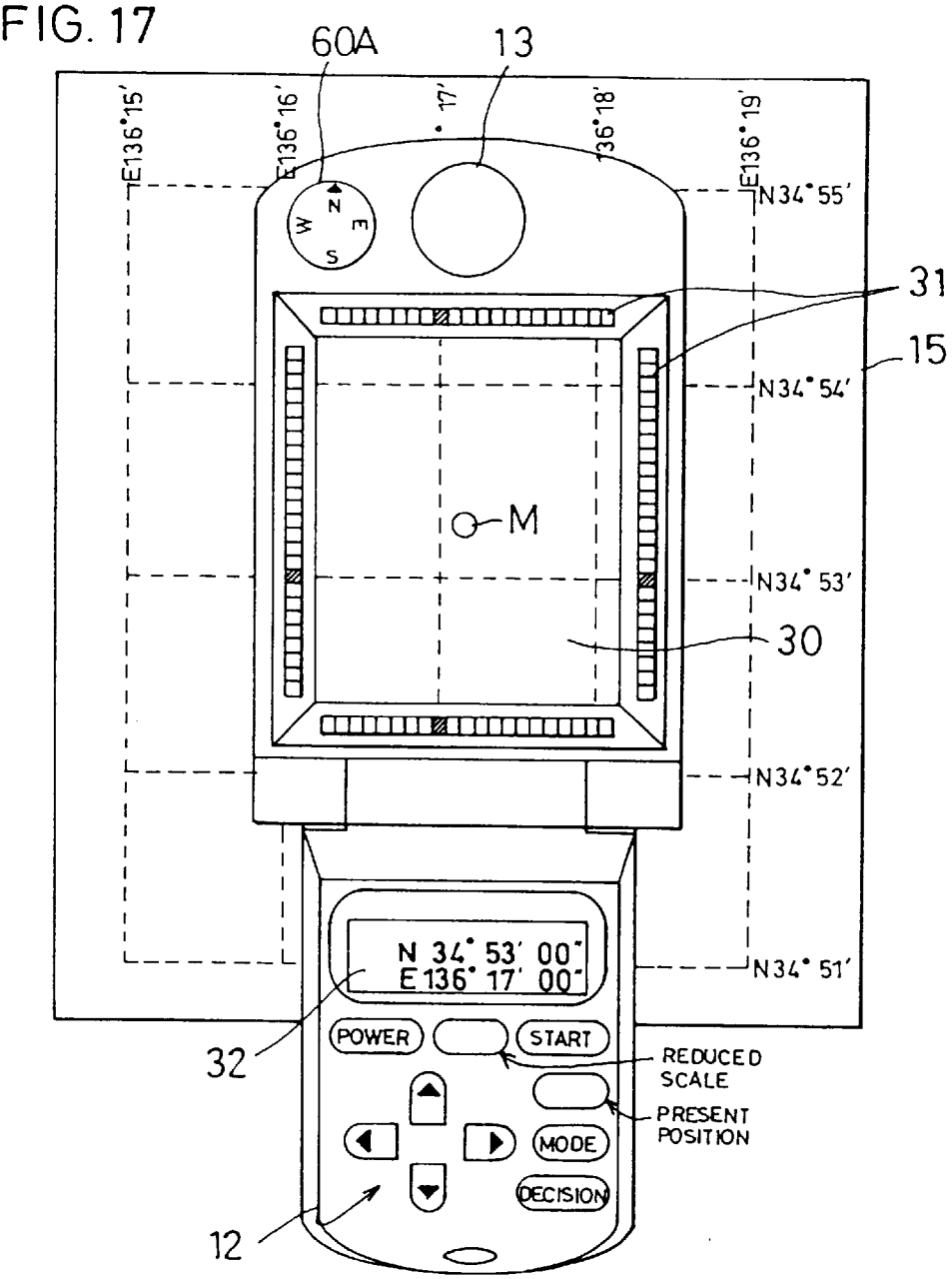
FIG. 17 is a schematic explanatory view for a state in which the apparatus in FIG. 13 is used on a map.
Figure 18:
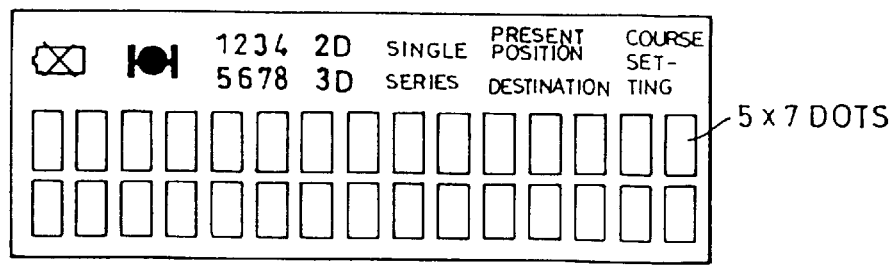
FIG. 18 is an explanatory view for another embodiment of the apparatus according to the present invention.

Other constituents and their functions of the present embodiment are the same as those in the foregoing embodiments, including the double-foldable arrangement as will be clear when FIGS. 14 and 15 are referred to, as well as the arrangement for recognizing the present position by placing the apparatus on the map 15 properly in accordance with the reduced rate as will be clear from FIG. 17.

According to another feature of the present invention, it is possible to realize the display of the present position by replacing the display device 11 in the embodiment of FIGS. 1 and 2 and comprising the transparent plate and diode-array display unit, by a permeable type liquid crystal display of dot-matrix structure through which the map is visible. For this liquid crystal display plate, one which allows things on its reverse side to be seen from the front side is employed, and the plate is mounted to the window penetrating through the body 14 or the display device side section 14a.

The control device 12 may be of the same arrangement as in the foregoing embodiments, while the present position mark M is made operable with such computer 18 as a microcomputer in which the desplaying control data are prepared by the cursor, and with keys K1–K7 acting as an input means for providing the data to the computer 18, in which the key K7 is employed as a cruciform cursor.

According to the present feature, a standard reduced-scale value is preliminarily set, and a reduced-scale input key K3 is operated when the standard value is different from the reduced scale of the map 15, whereby the computer 18 is made to execute the operation of reduced scale input mode, the reduced scale value obtained for this time is displayed on the liquid crystal display plate of the display device 11, and preferably the cursor is caused to perform a flashing sign at the lowest place figure of the displayed figures. At this state, the cursor position as the present position mark is shifted by left and right switches of the cursor key K7, and the figure below the cursor is increased or decreased by upper and lower switches of the key K7, so that the reduced scale value can be modified. As the reduced scale desired is reached, the decision key K6 is operated, the particular reduced scale value is thereby set and, unless the value is altered, the particular value set is employed for the calculation of the position to be displayed by the present position mark M by means of the computer 18 until the power source is cut off. Instead of using the standard value, at this time, it is also possible to so arrange that the reduced scale input mode is attained simultaneously with the power source connection to set the reduced scale value before starting the survey.

In the GPS as the surveying means, a WGS84 coordinates system is used as the system for surveying the latitude and longitude, but the coordinates system is different between respective zones in the world so that, when the apparatus is used in a zone where the standard system is not of the WGS84 coordinates, the system is required to be varied to the standard system employed in the zone. Here, the MAPS key K2 is operated to have the currently selected maps indicated by a flashing. The selection of the maps is executed by shifting the cursor in vertical and horizontal directions with the cursor key K7 operated, the DECISION key K6 is operated when the selected maps are set, the computer 18 responds to the operation of the DECISION key K6 to write the data of the selected maps in a memory, and thereafter the WGS84 coordinates system is to be converted into the particular maps.

Now, as the DESTINATION key K4 is operated after the power source connection or in a state where the present position is being surveyed, a lead-to-destination mode is attained when the destination is already set, or a destination-setting mode is reached when the destination is not set yet, while a further operation of the DESTINATION key K4 in the event where the destination is already set causes the destination-setting mode to be attained. Further, the arrangement is so made that the completion of the destination setting or the DESTINATION key K4 is operated in the destination-setting mode, the original state is restored.

In the event where the destination-setting mode is attained, further, the present position mark M of the display device 11 is first placed on the map 15 to agree with the position of the destination, the latitudinal line X is shifted up and down by means of the vertical switches of the cursor key K7 to come in agreement with a latitudinal line closest to the destination on the map 15, and the DECISION key K6 is operated upon the agreement. Next, the longitudinal line Y is shifted left and right with the horizontal switches in the cursor key K7 to be brought into agreement with the longitudinal line closest to the destination on the map 15, and the DECISION key K6 is operated upon the agreement. At this time, the latitudinal and longitudinal values currently being serveyed or last surveyed are displayed on the liquid crystal display plate of the display device 11 under the control of the computer 18, and at the same time the cursor is displayed in correspondence with the topmost place of the latitudinal value. Here, the latitudinal value of latitudinal line X being displayed is made to be displayed with the cursor key K7 employed in the same manner as in the foregoing setting of the reduced scale value, and the display is decided by the DECISION key K6. With this decision, the cursor is displayed in correspondence to the topmost place of the longitudinal value in the computer 18, and the longitudinal value of the longitudinal line Y being displayed is made to be displayed by the cursor key K7 employed in the same manner as in the foregoing setting of the reduced scale value, and the display is decided by the DECISION key K6.

As the foregoing operation is executed, the computer 18 calculates the distance between the set latitudinal and longitudinal lines and the present position mark M, and the latitude and longitude of the destination on the basis of the reduced scale. The DESTINATION key K4 is operated in the state of surveying the present position, and the lead-to-destination mode is reached. Then the computer 18 calculates differences of the latitude and longitude of the present position from the latitude and longitude of the destination obtained in the destination setting mode, and a straight course distance between the present position and the destination as well as the direction of the destination as viewed from the present position are thereby obtained. Then, the straight course distance to the destination and its direction are displayed on the liquid crystal display 32 of the display device 11, and the direction from the present position mark M to the destination is to be displayed.

It should be appreciated that the set mode of the present position can be set by means of the PRESENT POSITION key K1, in which mode the setting of the present position setting can be performed with the cursor key K7 and DECISION key K6 employed in the same manner as in the destination setting.

Figure 19:
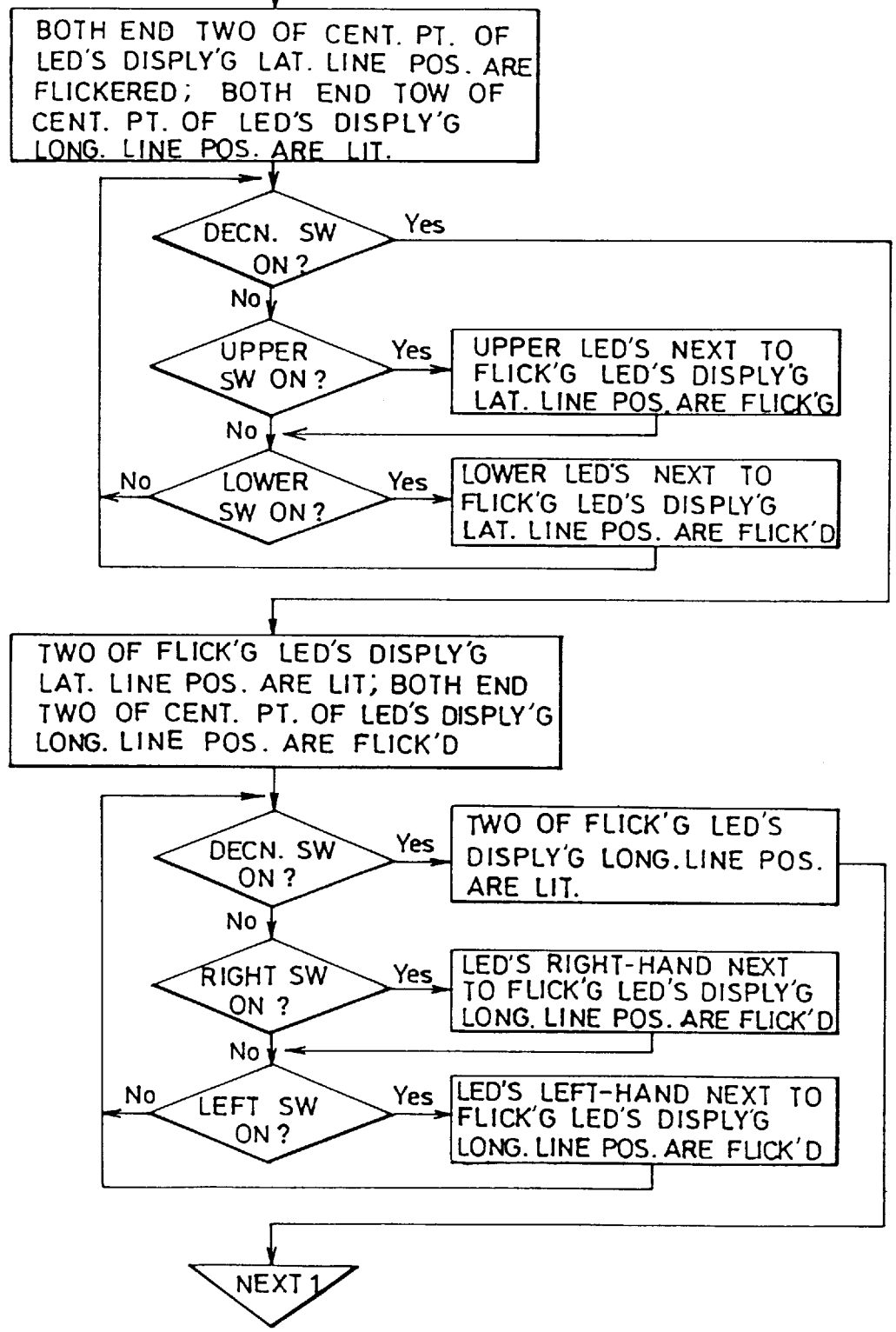
FIG. 19 is a flow chart for explaining the operation of the apparatus in another embodiment according to the present invention.

In the respective foregoing embodiments, the latitudinal and longitudinal lines closest to the destination on the map 15 are sequentially followed for the navigation by the lighted opposing diode pairs of the vertical and horizontal light emitting diode arrays forming the display 31 of the display device 11, or the cursor of the liquid crystal display plate, the lighted diodes or the cursor being shifted in vertical and horizontal directions by means of the cursor key K7, in accordance with a flow chart of FIG. 19.

Figure 20:
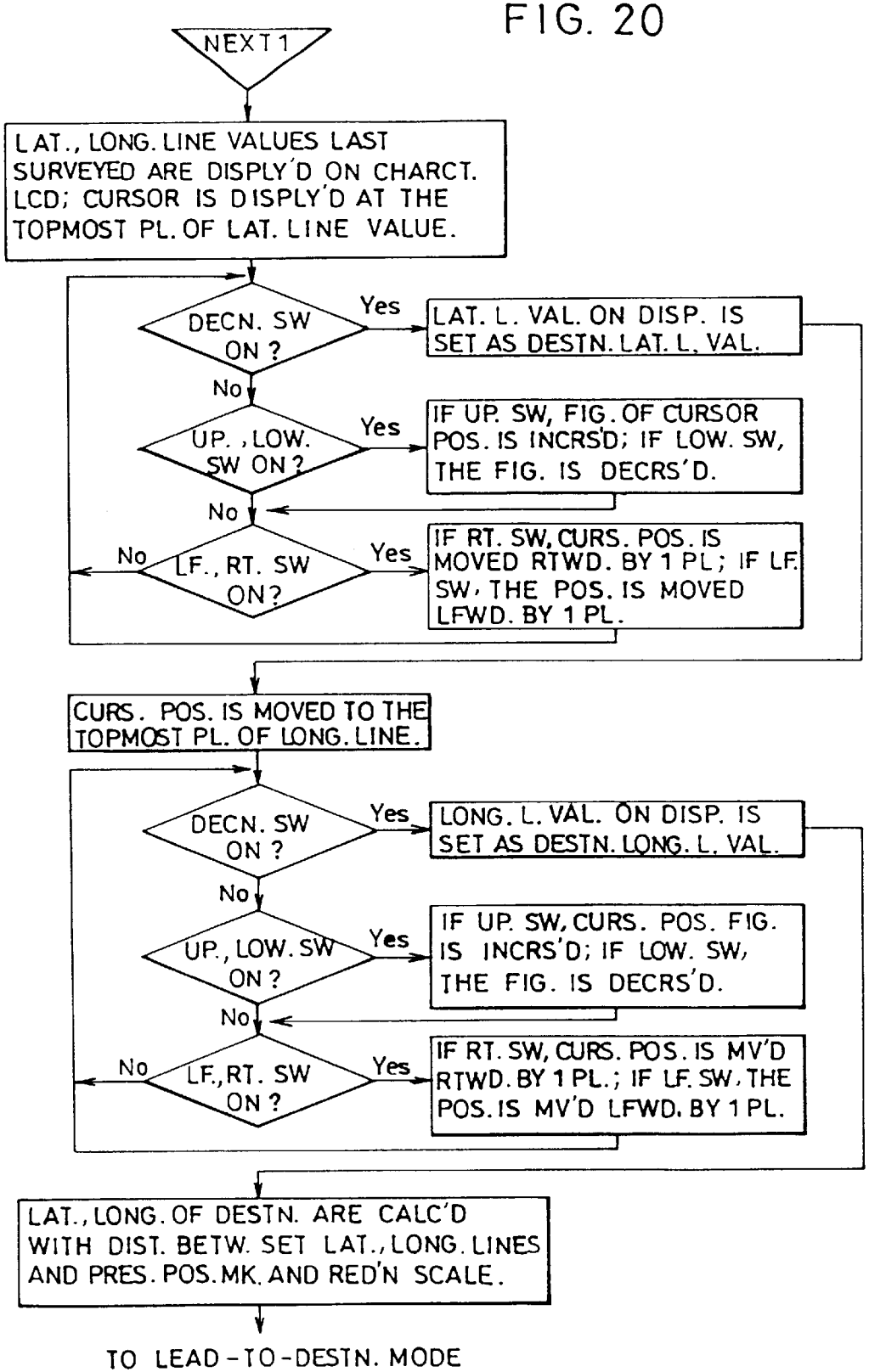
FIG. 20 is a flow chart for explaining the operation of the apparatus in still another embodiment of the present invention.

Further, it is also possible to employ an arrangement in which, in accordance with a flow chart of FIG. 20, the latitudinal and longitudinal values surveyed right now or the last time are displayed on the liquid crystal display 32, and the latitudinal and longitudinal values closest to the destination being displayed by the lighted diodes in the light emitting diode arrays or by the cursor of the liquid crystal display are thereby set.

What is claimed is:

1. A portable navigation apparatus for use in combination with a generally available map that includes latitudinal and longitudinal lines and a scale of reduction, comprising:

means for surveying the latitude and longitude of a present position;

means for inputting and setting in the portable navigation apparatus the scale of reduction of the map used;

a display device including a permeable type display means having a present position mark and including means for displaying on the permeable type display means at least portions of the closest latitudinal and longitudinal lines with respect to the present position mark; and a control device including means for obtaining reference latitudinal and longitudinal values corresponding to the latitudinal and longitudinal lines described on the map to be the closest to the present position on the map and corresponding to the surveyed present position, and including means for displaying positions of the closest latitudinal and longitudinal lines on the permeable type display means in accordance with the reference latitudinal and longitudinal values obtained and with the set scale of reduction of the map, the portable navigation apparatus being placed on the map to bring the respective displayed positions of the latitudinal and longitudinal lines on the display device to coincide with the corresponding closest latitudinal and longitudinal lines on the map, and to point out the present position on the map with the present position mark of the permeable type display means.

2. The portable navigation apparatus according to claim 1 wherein the control device further includes means for preliminary setting intervals between the respective latitudinal and longitudinal lines the positions of which are displayed by the permeable type display means, in accordance with the scale of reduction of the map.

3. The portable navigation apparatus according to claim 1 which further comprises an azimuth sensing means, and means for indicating a sensed azimuth and the reference latitudinal and longitudinal values of the present position surveyed.

4. The portable navigation apparatus according to claim 1 wherein the permeable type display means comprises a square transparent plate having the present position mark, and horizontal and vertical light emitting diode arrays respectively lying along mutually opposing pairs of side edges of the transparent plate for displaying the positions of the latitudinal and longitudinal lines to be displayed.

5. The portable navigation apparatus according to claim 4 wherein the present position mark is provided as fixed in the center of the transparent plate.

6. The portable navigation apparatus according to claim 5 wherein the fixed present position mark is a through hole made in the transparent plate.

7. The portable navigation apparatus according to claim 1 wherein the permeable type display means is a liquid crystal display means.

8. The portable navigation apparatus according to claim 1 wherein the apparatus comprises a plurality of casings mutually coupled through a hinge section allowing the casings mutually pivotable into a double-folded state, one of said casings including the permeable type display means which is provided in the form of a recess capable of receiving therein at least part of another casing in said double-folded state.

9. The portable navigation apparatus according to claim 1 wherein the permeable type display means of the display device is provided for shifting and setting the indicating positions of the latitudinal and longitudinal lines to those the closest to the present position mark which is regarded here as a destination, and the control device includes means for operating a destination-setting and a lead-to-destination with the positions set for the destination with reference to the reference latitudinal and longitudinal values of the present position surveyed.

10. The portable navigation apparatus according to claim 1 wherein the display device further includes an azimuth sensor.

11. The apparatus according to claim 1, further comprising a liquid crystal display for displaying in letters and figures respective input and output data of the surveying means, scale inputting and setting means, display device and control device.

12. The portable navigation apparatus according to claim 11 wherein the permeable type display means of the display device is provided for shifting and setting the indicating positions of the latitudinal and longitudinal lines to those the closest to the present position mark which is regarded here as a destination, and the control device includes means for operating a destination-setting and a lead-to-destination with the positions set for the destination with reference to the reference latitudinal and longitudinal values of the present position surveyed.

13. The portable navigation apparatus according to claim 12 wherein the display device further includes an azimuth sensor.

14. A portable navigation apparatus for use in combination with any generally available map such as is commonly used for example by hikers, motorists or bicyclists that includes latitudinal and longitudinal lines and a scale of reduction, comprising:

apparatus for setting in the portable navigation apparatus the scale of reduction of the map;

apparatus for surveying the latitude and longitude of a present position;

a frame having a window through which the map may be viewed when the frame is placed on the map;

a display device mounted to the frame, the display device including:

a transparent plate mounted in the window, the transparent plate including a present position mark;

apparatus for indicating reference latitudinal and longitudinal lines of the map that are closest to the present position; and apparatus for displaying latitudinal and longitudinal lines corresponding to the present position; and a control device including:

apparatus for determining latitudinal and longitudinal values corresponding to the present position;

apparatus for determining reference latitudinal and longitudinal values corresponding to the latitudinal and longitudinal lines on the map that are the closest to the present position; and apparatus for controlling the display apparatus to display the latitudinal and longitudinal values corresponding to the present position and to display the reference latitudinal and longitudinal lines closest to the present position in accordance with the latitudinal and longitudinal values obtained for the present position and with the set scale of reduction of the map;

the frame being placed on the map to bring the respective displayed positions of the latitudinal and longitudinal lines on the display device to coincide with the corresponding latitudinal and longitudinal lines on the map, and to point out the present position on the map with the present position mark.

\* \* \* \* \*